United States Patent
Buonpane et al.

(10) Patent No.: US 9,158,359 B2
(45) Date of Patent: Oct. 13, 2015

(54) ADAPTIVE VOLTAGE SCALING USING A SERIAL INTERFACE

(75) Inventors: Michael S. Buonpane, Easton, PA (US); James D. Chlipala, Emmaus, PA (US); Richard P. Martin, Macungie, PA (US); Richard Muscavage, Gilbertsville, PA (US); Scott A. Segan, Allentown, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 735 days.

(21) Appl. No.: 13/428,862

(22) Filed: Mar. 23, 2012

(65) Prior Publication Data

US 2013/0249290 A1    Sep. 26, 2013

(51) Int. Cl.
*H02J 1/00* (2006.01)
*G06F 1/32* (2006.01)

(52) U.S. Cl.
CPC .............. *G06F 1/3209* (2013.01); *G06F 1/325* (2013.01); *G06F 1/3296* (2013.01); *Y02B 60/1285* (2013.01); *Y10T 307/406* (2015.04)

(58) Field of Classification Search
None
See application file for complete search history.

(56) References Cited

U.S. PATENT DOCUMENTS

| | | | |
|---|---|---|---|
| 5,952,733 A * | 9/1999 | Johnston | 307/44 |
| 6,914,954 B2 | 7/2005 | Lee et al. | |
| 2004/0268278 A1 * | 12/2004 | Hoberman et al. | 716/5 |
| 2006/0181558 A1 * | 8/2006 | Walmsley et al. | 347/12 |
| 2009/0158061 A1 | 6/2009 | Schmitz et al. | |

* cited by examiner

*Primary Examiner* — Jared Fureman
*Assistant Examiner* — Aqeel Bukhari
(74) *Attorney, Agent, or Firm* — Sheridan Ross P.C.

(57) ABSTRACT

An adaptive voltage scaling system includes first and second devices. Each of the first and second devices includes at least one master serial interface port and at least one slave serial interface port. The first device is operatively coupled to a voltage regulator, and the slave serial interface port associated with the second device is operatively coupled to the master serial interface port associated with the first device. The first device controls the voltage regulator based on information obtained from the first and second devices using the master serial interface port associated with the first device and the slave serial interface port associated with the second device. The first and second devices receive voltage from the voltage regulator. A corresponding method and computer-readable medium are also disclosed.

22 Claims, 6 Drawing Sheets

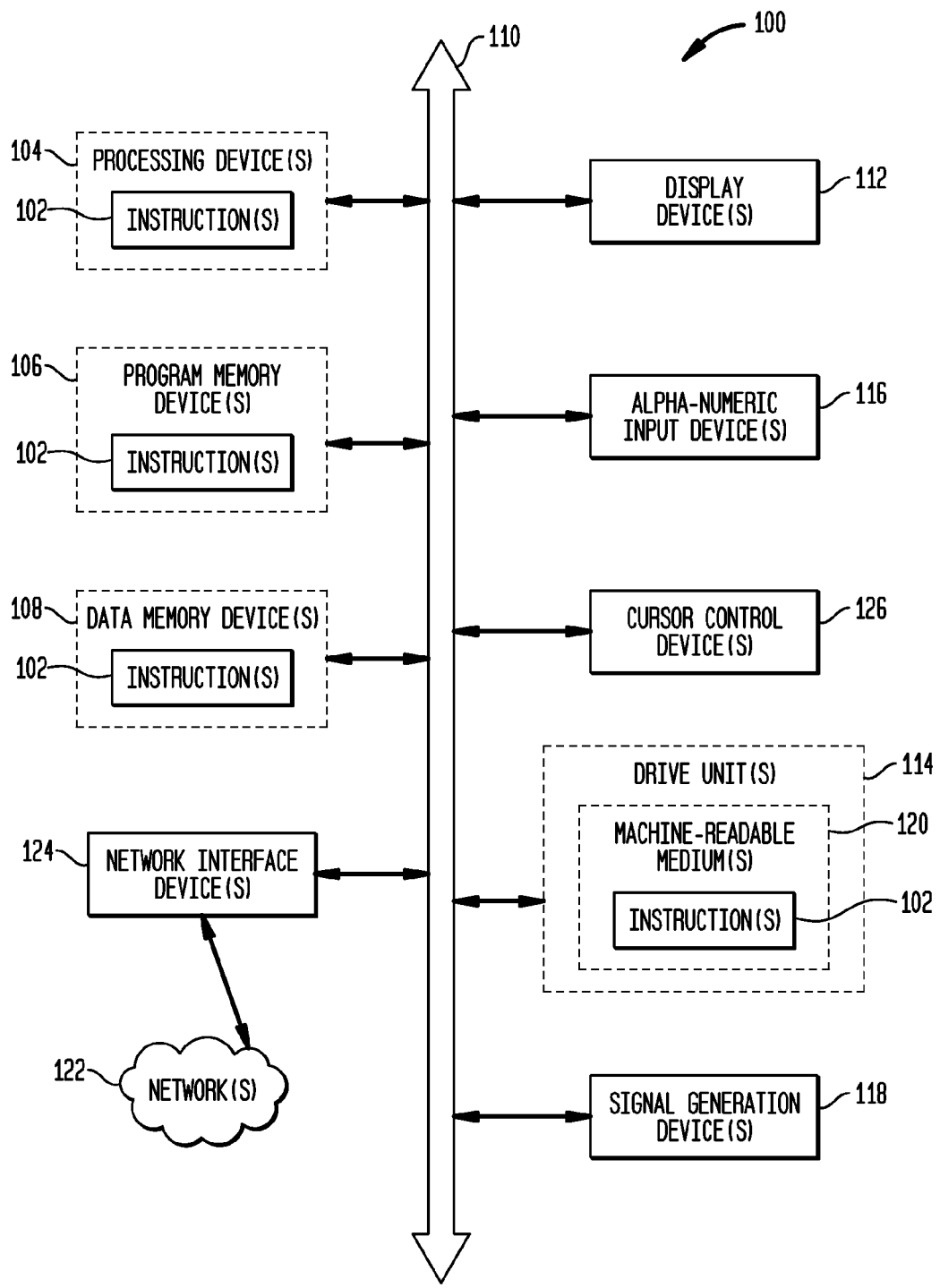

ADAPTIVE VOLTAGE SCALING USING A SERIAL INTERFACE

SUMMARY

Various embodiments of the invention relate to a device, method, and computer-readable medium that reduce a quantity of voltage regulators used to perform adaptive voltage scaling.

An adaptive voltage scaling system includes first and second devices. Each of the first and second devices includes at least one master serial interface port and at least one slave serial interface port. The first device is operatively coupled to a voltage regulator, and the slave serial interface port associated with the second device is operatively coupled to the master serial interface port associated with the first device. The first device controls the voltage regulator based on information obtained from the first and second devices using the master serial interface port associated with the first device and the slave serial interface port associated with the second device. The first and second devices receive voltage from the voltage regulator. A corresponding method and computer-readable medium are also disclosed.

The following detailed description of illustrative embodiments of the invention is to be read in connection with the accompanying drawings.

BRIEF DESCRIPTION OF THE DRAWINGS

The following drawings are provided by way of example only and without limitation, wherein like reference numerals (when used) indicate corresponding elements throughout the several views, and wherein:

FIG. 6 is a block diagram depicting at least a portion of an exemplary machine in the form of a computing system configured to perform the methods herein, according to an embodiment of the invention.

Figure 1:
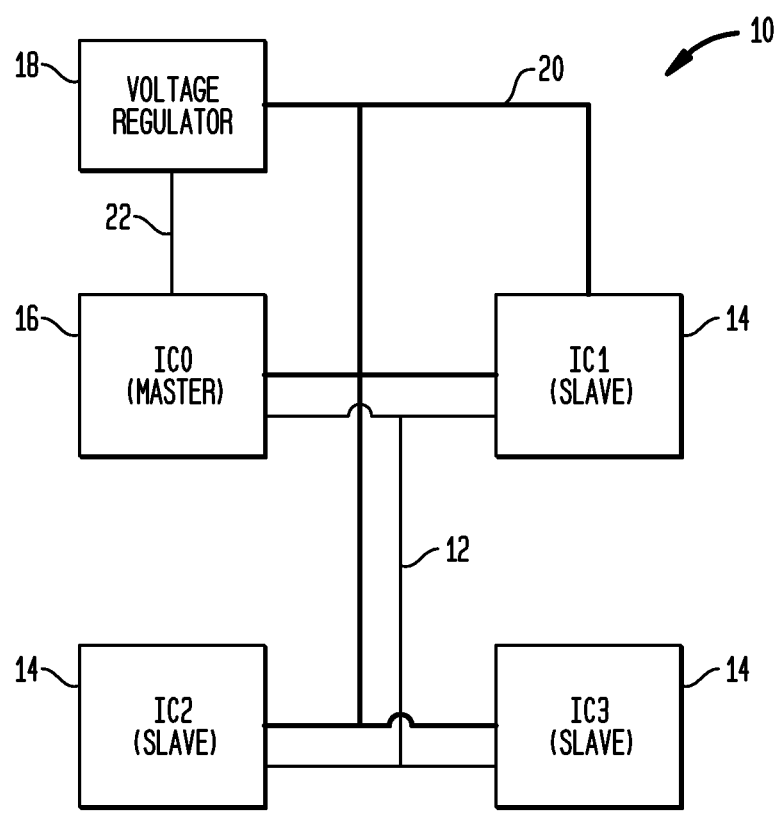
FIG. 1 is a block diagram depicting at least a portion of an exemplary adaptive voltage scaling system, according to an embodiment of the invention.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

The present invention relates generally to electrical and electronic devices and circuits, and more particularly relates to techniques for controlling power in such devices and circuits.

With increasing emphasis on lowering power consumption in electronic systems and devices, particularly portable devices (e.g., mobile phones, etc.), many system employ a technique known as adaptive voltage scaling (AVS). In a processor-based system, for example, AVS provides a lower power supply voltage for a given frequency of operation by utilizing a closed-loop approach. The AVS loop regulates processor performance by automatically adjusting the output voltage of the power supply to compensate for process and temperature variation in the processor.

In conventional AVS approaches, each integrated circuit and/or device in a system is assigned a dedicated voltage regulator, which provides power to its corresponding circuit and/or device. Consequently, as the quantity of circuits and/or devices in the system increases, so too does the quantity of voltage regulators. This results in a substantial increase in space requirements and power consumption associated with the overall system, which is undesirable.

Embodiments of the invention will be described herein in the context of illustrative devices and methods, as well as computer-readable medium, configured to reduce silicon or chip real estate and power consumption in adaptive voltage scaling (AVS) systems. It should be understood, however, that the embodiments are not limited to these or any other particular circuit arrangements. Rather, embodiments of the invention are more generally applicable to techniques for reducing the size and power consumption of AVS systems, among other features. Moreover, it will become apparent to those skilled in the art given the teachings herein that numerous modifications can be made to the embodiments described herein while remaining within the scope of the disclosure. That is, no limitations with respect to the specific embodiments described herein are intended or should be inferred.

The embodiments of the invention relate to techniques involving multiple integrated circuits (ICs), for example, on a board or within a multi-chip module (MCM), that are coupled together through a serial interface, wherein at least one of the ICs is able to control a voltage regulator. In a first embodiment, one of the ICs functions as a master device and the remaining IC or ICs function as slave devices. The master device communicates to one or more slave devices through a serial interface, in which AVS information, such as process, voltage, and/or temperature (PVT) information, is transferred to the master device. The master device then determines an appropriate value at which to set the voltage regulator in order to reduce power consumption while achieving a desired performance.

The embodiments of the invention address the issues associated with utilizing a voltage regulator for each IC, which necessitates substantial additional board or chip space and power consumption. In addition, a serial interface utilized by embodiments of the invention reduces connectivity requirements between ICs.

AVS is used to control a voltage level provided to an IC in order to reduce power while maintaining a desired level of overall performance. In a standard AVS system, each IC has a dedicated voltage regulator with which the corresponding IC communicates to adjust the voltage supplied to the IC in an effort to reduce power consumption. Therefore, in such systems, as the quantity of ICs on a board or within an MCM increases, the number of required voltage regulators also increases, which is undesirable. This increase in the number of voltage regulators reduces the amount of logic that can fit on a board or in an MCM, which causes the board or MCM to get larger, thus increasing the cost to produce the end product.

Figure 2:
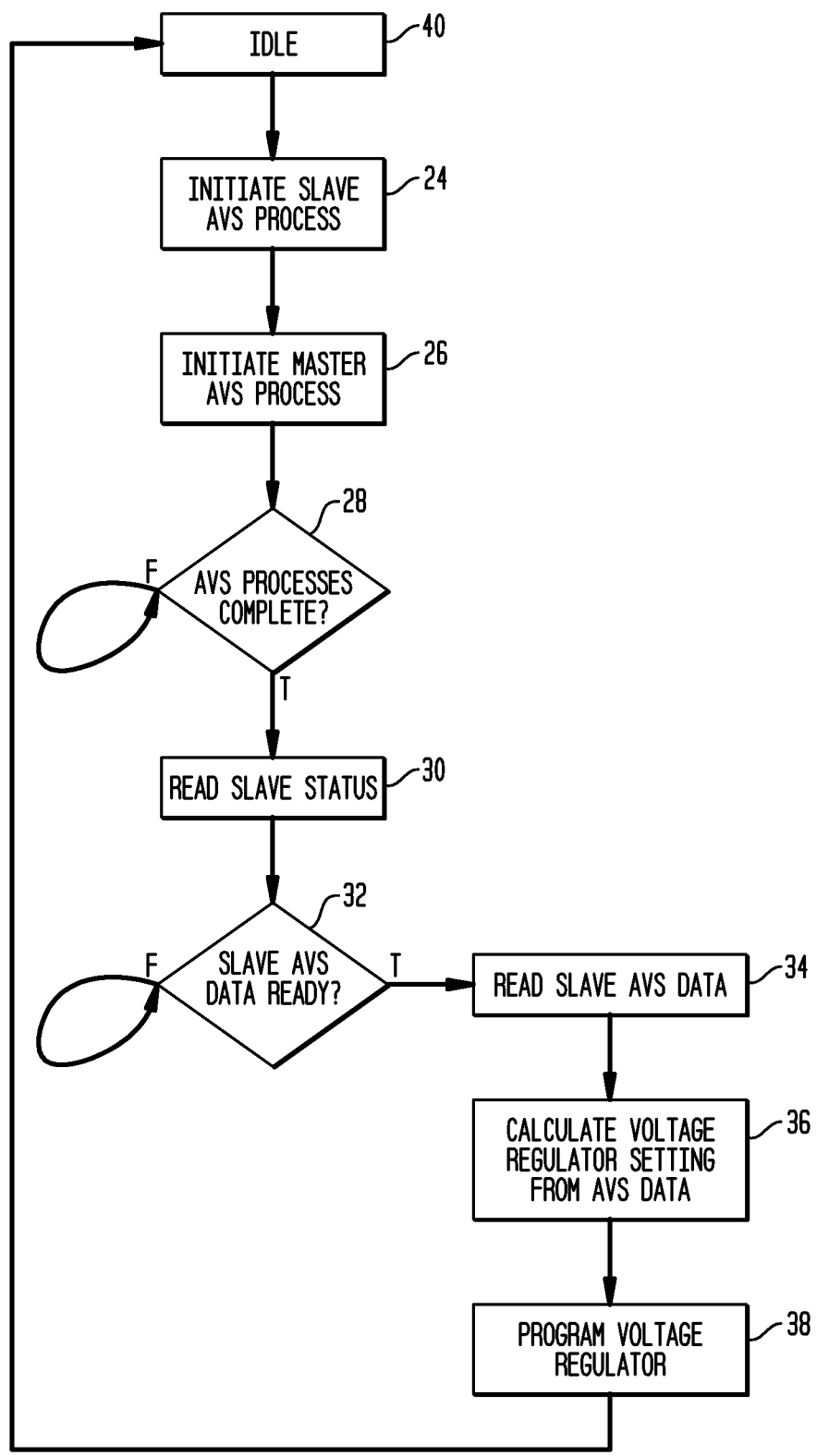
FIG. 2 is a flowchart illustrating an exemplary method for adaptive voltage scaling, according to an embodiment of the invention.

To address a noted problem of adding voltage regulators as the number of ICs on a board or within an MCM increases, embodiments of the invention incorporate a serial interface between ICs that enables one IC to control, on behalf of a plurality of ICs, a voltage regulator shared by at least a subset of the ICs. A one-bit serial interface utilized in embodiments of the invention also reduces the number of interconnections between ICs, thereby providing a substantial savings in routing resources. Embodiments of the invention use a procedure that calculates a voltage regulator setting to reduce power consumption while maintaining a desired level of performance. FIG. 2 shows an illustrative procedure in which a master IC requests monitor data via a serial interface from slave ICs, determines a worst-case set of data from the monitor data provided, and adjusts the voltage regulator according to the determined worst-case data.

FIG. 1 is a block diagram depicting at least a portion of an exemplary AVS system 10, according to an embodiment of the invention. The AVS system 10 includes a serial interface 12 coupled with a plurality of ICs 14 and 16 for establishing communications therebetween. Specifically, a first IC (IC0) 16, a second IC (IC1) 14, a third IC (IC2) 14, and a fourth IC (IC3) 14, communicate with one another via the serial interface 12. In the first embodiment, IC0 16 functions as a master device and IC1, IC2, and IC3 14 function as slave devices. The master device IC0 16 communicates with the slave devices IC1, IC2, IC3 14 to receive information for PVT calculations. IC0 16 is also operative to control a voltage regulator 18 using a voltage regulator control signal 22, which in this embodiment is a pulse-width modulated signal. It is to be understood that alternative means for controlling the voltage regulator 18 are similarly contemplated, according to other embodiments. For example, an alternative type of control signal 22 is implemented, according to another embodiment, using a parallel digital interface. The voltage regulator 18 provides a core voltage or power, via a power bus 20 or alternative connection arrangement, to the ICs 14, 16.

FIG. 2 is a flowchart illustrating an exemplary method for performing AVS to provide the core voltage or power to the master and slave devices 16 and 14, respectively, according to an embodiment of the invention. From an idle state 40, the master device 16 initiates an AVS calculation by sending a command to the slave devices 14 using the serial interface 12 in step 24. While the slave devices 14 are performing their respective AVS calculations, the master device 16 initiates its own AVS calculations in step 26. The AVS calculations include determining a PVT condition for the corresponding IC. After the master device 16 has completed its own calculations, the master device 16 polls the status of the slave devices 14 in step 28 to determine whether the slave device calculations are finished. When the AVS calculations are complete (T) as determined in step 28, the slave status is read in step 30. When the AVS calculations are not complete (F) as determined in step 28, the method remains in step 28 until such AVS calculations are completed.

After reading the slave status in step 30, the method checks whether data from the slave device is ready in step 32. When the slave AVS data is not ready (F) as determined in step 32, the method remains in step 32 until such slave AVS data is ready to be read. When it is determined in step 32 that the slave AVS data is ready (T), the slave AVS data is read in step 34. The master device 16 then determines which of the plurality of ICs 14, 16 contains data indicative of less favorable operating conditions of the system 10 (e.g., worst-case data) and uses parameters associated with this data to determine a value at which to set the voltage regulator output voltage in step 36 in order to reduce power consumption while maintaining an appropriate level of operating performance for the system 10. The master device 16 then controls (e.g., sets or programs) the voltage regulator in step 38 based on the data from step 36 and, after a prescribed amount of time, restarts the process at step 40.

By way of example only, the master device 16 uses data associated with the master device 16 and the slave device(s) 14 to determine the worst-case data. Such data could be generated by a monitor, which is not explicitly shown in the drawings for simplicity of presentation. Such a monitor would return a single numerical result that reflects the process, voltage and temperature environment of its corresponding IC (such as a ring oscillator). For example, the single numerical result could be a two digit hexadecimal number.

To illustrate, assume that simulations of the monitor reveal that a numerical result of 0×07 is the smallest such monitor result which allows acceptable IC performance. Numerical results greater than 0×07 reflect IC performances that exceed the minimum acceptable performance level. If the master device (IC0 16) has a value of 0×10, slave device 1 (IC1 14) has a value of 0×11, slave device 2 (IC2 14) has a value of 0×12, and slave device 3 (IC3 14) has a value of 0×0A, then slave device 3 exhibits the worst-case data. Since the worst-case data (0×0A) is still above the monitor's threshold value (that is, 0×07) the master device 16 decreases the voltage by adjusting the voltage control signal 22 accordingly. However, if the worst-case data is equal to or less than the monitor's threshold value, the master device 16 increases the voltage by adjusting the voltage control signal 22 accordingly.

The method shown in FIG. 2 is intended as an exemplary method, which can be used to adjust the voltage regulator using data received from master and slave devices without limiting the scope of the embodiments herein. Alternatively, the master device need not wait until completion of its AVS calculations before reading the status of slave devices. As another alternative, the master device reads slave status and obtains slave AVS data prior to initiating the master AVS process. It is to be noted that the order of the steps shown in FIG. 2 are alterable while remaining within the scope of the embodiments of the invention.

Figure 3:
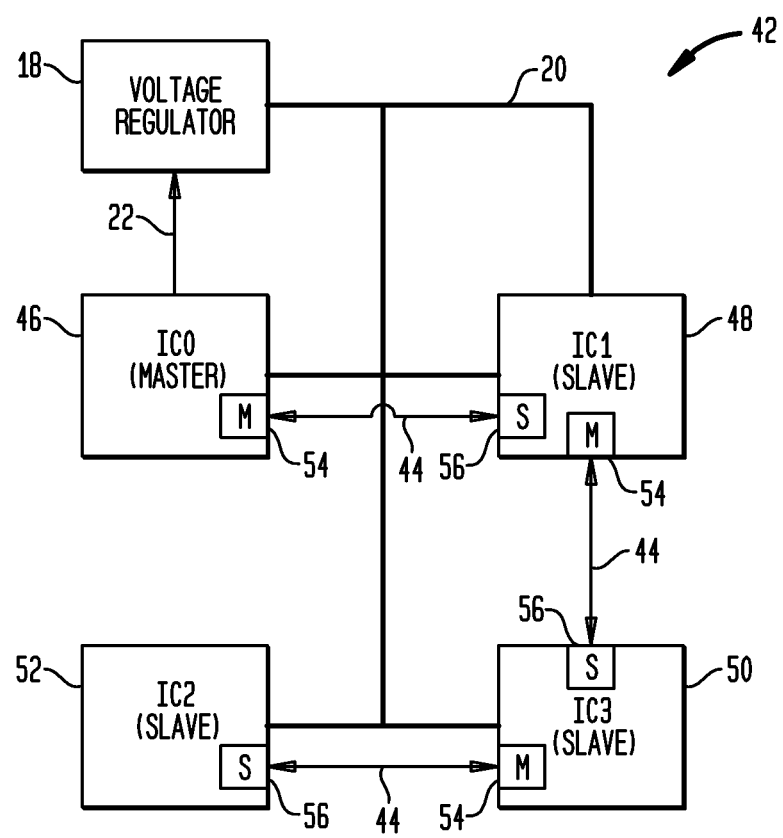
FIG. 3 is a block diagram depicting at least a portion of an exemplary adaptive voltage scaling system, according to another embodiment of the invention.

FIG. 3 is a block diagram depicting at least a portion of an exemplary AVS system 42, according to another embodiment of the invention. More particularly, FIG. 3 shows an exemplary system 42 utilizing AVS through a daisy-chained serial interface. As discussed above, in some AVS systems, a single IC or group of ICs has a dedicated voltage regulator, with which the ICs communicate in order to adjust the voltage. These approaches include dedicated voltage regulators or voltage control units (VCUs) and require the devices to communicate with their corresponding VCU directly. In these approaches, the VCU processes the information from each IC to determine the adjustment to be applied to the dedicated voltage regulator. Thus, the VCU acts as a master control unit with the slave IC's communicating with it so that the VCU is able to control the voltage regulator. However, this approach requires a wire or bus from each IC to communicate with the VCU, which substantially limit the maximum size and performance of the resulting system.

In the illustrative embodiment shown in FIG. 3, the devices or ICs, which are able to accept different voltages or power levels, include a processing unit that is configurable as both a master device and/or slave device. To accomplish this, each IC includes both a slave serial interface port (S) and a master serial interface port (M), although one of the ports may not be enabled, depending upon the function (e.g., master, slave, or both master and slave) of the IC in the system. The slave serial interface port of one device is connected with the master serial interface port of an adjacent upstream device (i.e., a device closer to the voltage regulator), as will be described in further detail below. This allows the ICs to be serially daisy-chained together such that AVS processing is not done centrally but is distributed along the serial chain. The last device down the chain, that is, farthest away from the voltage regulator, functions as a slave device that provides performance, process, and/or voltage data to the next device up the chain, that is, towards the voltage regulator, which can function as both a master and a slave device. The last device up the chain, that is, closest to the voltage regulator, functions as a master device and receives AVS data from the preceding or subordinate slave device(s) down the chain, that is, in a direction away from the voltage regulator. The master device processes the AVS information for itself and one or more slave devices. The master device (unless this master device is the last device up the chain) then acts as a slave device and feeds the processed result, including the AVS information from itself (master device) and the preceding one or more slave devices, to the next device up the chain towards the voltage regulator. The last device up the chain next to the voltage regulator, which communicates directly with the voltage regulator, acts as a master device to provide a voltage regulator control signal based on cumulative AVS information from one or more devices in the chain.

With reference now to FIG. 3, the AVS system 42 includes a daisy-chained serial interface 44 between ICs 46, 48, 50 and 52. In this embodiment, based on a position of the device along the serial daisy chain, IC0 46 functions as a master device, IC1 48 and IC3 50 function as both master and slave device, and IC2 52 functions as a slave device. As the master device, IC0 46 controls the voltage regulator 18 using a voltage regulator control signal 22, which in this embodiment is a pulse-width modulated signal. It is to be understood that alternative means for controlling the voltage regulator 18 are similarly contemplated, according to other embodiments. For example, an alternative type of control signal 22 is implemented, according to another embodiment, using a parallel digital interface. The voltage regulator 18 provides a core voltage or power, via a power bus 20 or alternative connection arrangement, to the ICs 46-52. IC0 46 communicates with IC1 48, IC1 48 communicates with IC3 50, and IC3 50 communicates with IC2 52. In this configuration, IC0 46 has only its master serial interface port 54 enabled; IC1 48 and IC3 50 have both their master serial interface ports 54 and slave serial interface ports 56 enabled; and IC2 52 has only its slave serial interface port 56 enabled.

IC0 46 requests AVS information from the serial bus 44. In response thereto, if the IC has its master and slave interface ports configured (IC1 48, IC3 50), that IC will transmit AVS information up the chain towards the voltage regulator 18, as well as request AVS information from subordinate ICs down the chain away from the voltage regulator 18. This process continues until the request for AVS information is received by an IC that only has its slave interface port configured, such as IC2 52. This device (IC2 52) will then send the AVS information back to the master device (IC3 50) that had requested the AVS information. The requesting master device (IC3 50) compares the AVS information received from its subordinate slave device (IC2 52) with its own data. Data or AVS information indicative of less or the least favorable operating conditions (e.g., worst-case data), which is based on composite AVS information from subordinate ICs 48, 50, 52 is transmitted upstream in the direction of the voltage regulator 18 until the AVS information, which is indicative of the less favorable operating conditions among all of the subordinate IC devices 48, 50 and 52, is received by the master device IC0 46. The master device IC0 46 will then perform a comparison using the worst-case AVS information from each of the IC's 46-52 to determine whether the voltage regulator setting should be increased or decreased. Alternatively, the master device IC0 46 can perform comparisons incrementally as information is received from subordinate devices without waiting until all information has been received from the subordinate devices. As data is being transmitted upstream on the serial interface bus 44, the device that is waiting for the upstream data will not send data farther upstream until the data being waited on from downstream or subordinated device(s) has been received. Alternatively, the device that is waiting for the upstream data will send data farther upstream even if the data being waited on from downstream or subordinated device(s) has not yet been received.

Thus, the AVS system 42 enables any number of ICs to be serially daisy-chained together with a master device controlling the core voltage for multiple ICs. Further, the daisy-chained serial interface bus associated with the AVS system 42 is configured as a point-to-point connection, rather than a serial interface having three or more ICs on each serial interface port, which reduces loading on serial buffers associated with ICs 46-52. For serial interfaces connected to multiple ICs, there is a limitation, due to inherent limitations on the IC driver and the load on that driver (e.g., fan out), concerning the number of ICs that can be connected to the serial interface. With the daisy-chain method, there is no limitation on the number of ICs that can be connected together, since each individual connection in the daisy-chain connects a limited number of (e.g., two) ICs or devices.

Figure 4:
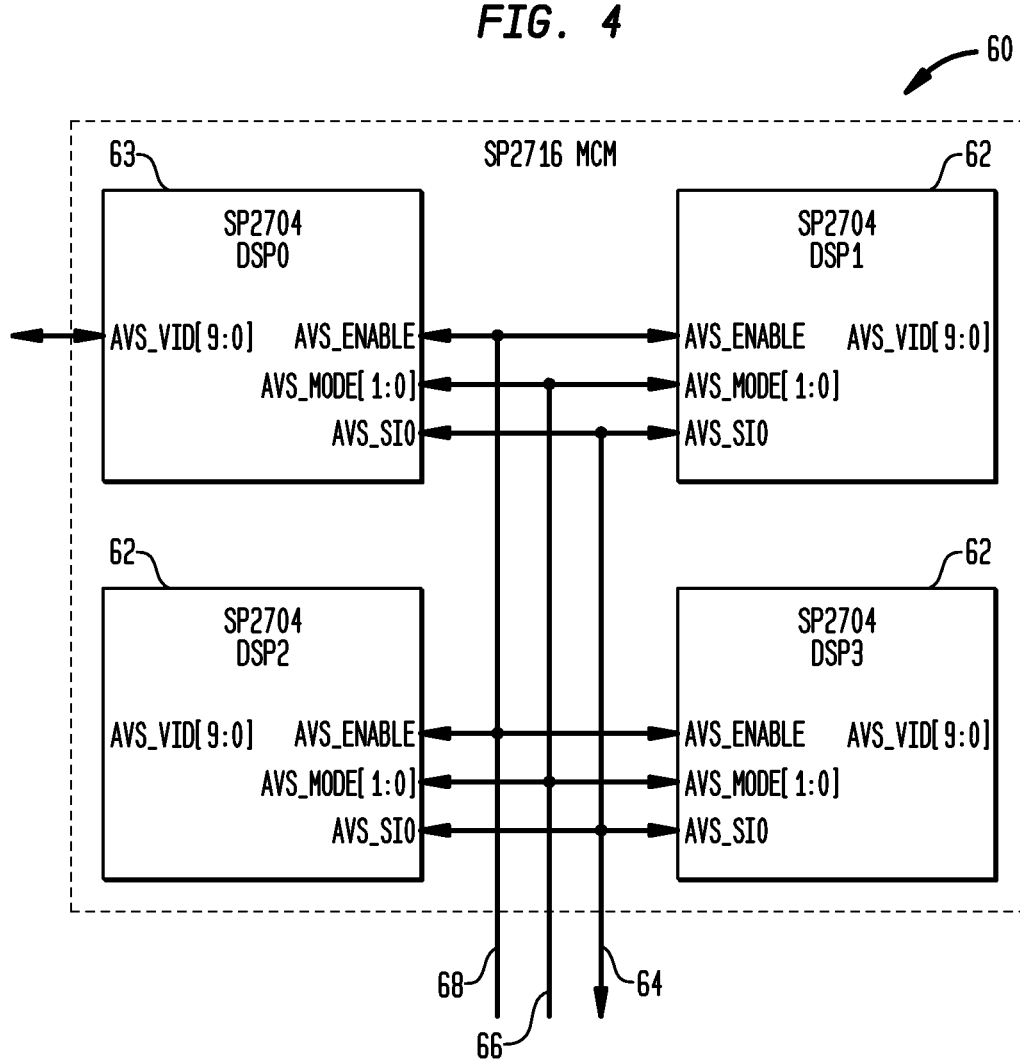
FIG. 4 is a block diagram depicting at least a portion of an exemplary adaptive voltage scaling system, according to yet another embodiment of the invention.

FIG. 4 is a block diagram depicting at least a portion of an exemplary AVS system 60, according to yet another embodiment of the invention. More particularly, FIG. 4 shows a fourth embodiment of an AVS system 60 implemented on a multi-chip module (e.g., SP2716MCM). The AVS system 60 provides an AVS interface to control a pulse-width modulated serial output voltage control signal based on fluctuations in process, voltage, and/or temperature information. The AVS system 60, in this embodiment, includes four (4) digital signal processors 62 and 63 (e.g., SP2704, commercially available from LSI Corporation, Milpitas, Calif.) operatively coupled by a serial interface 64, mode signals 66, and an enable signal 68. The digital signal processor 63, which is configured as a master device, uses data lines 64 to communicate with devices and/or systems external to the AVS system 60.

The AVS system 60, in one embodiment, uses ring oscillators and delay lines to monitor changes in device characteristics due to fluctuations in process, voltage, and/or temperature, although alternative monitoring circuit arrangements are similarly contemplated. The AVS system 60 interprets and uses data from this logic to control the pulse-width modulated serial output voltage control signal coupled to the voltage regulator. The AVS system 60 modulates the width of the positive pulse or duty cycle of the output voltage control signal. The rising-edge time to rising-edge time or frequency of the output voltage control signal remains unchanged. Corresponding changes to a VDD supply level provided to the ICs are made by the voltage regulator in response to changes in the duty cycle of the output voltage control signal. As an alternative to the pulse width modulated voltage control signal used by the master device to control the voltage regulator, a parallel digital (VID) interface, serial peripheral interface (SPI) or Inter-IC (I2C) bus interface can also be used, although the invention is not limited to such interfaces and/or signal types.

Figure 5:
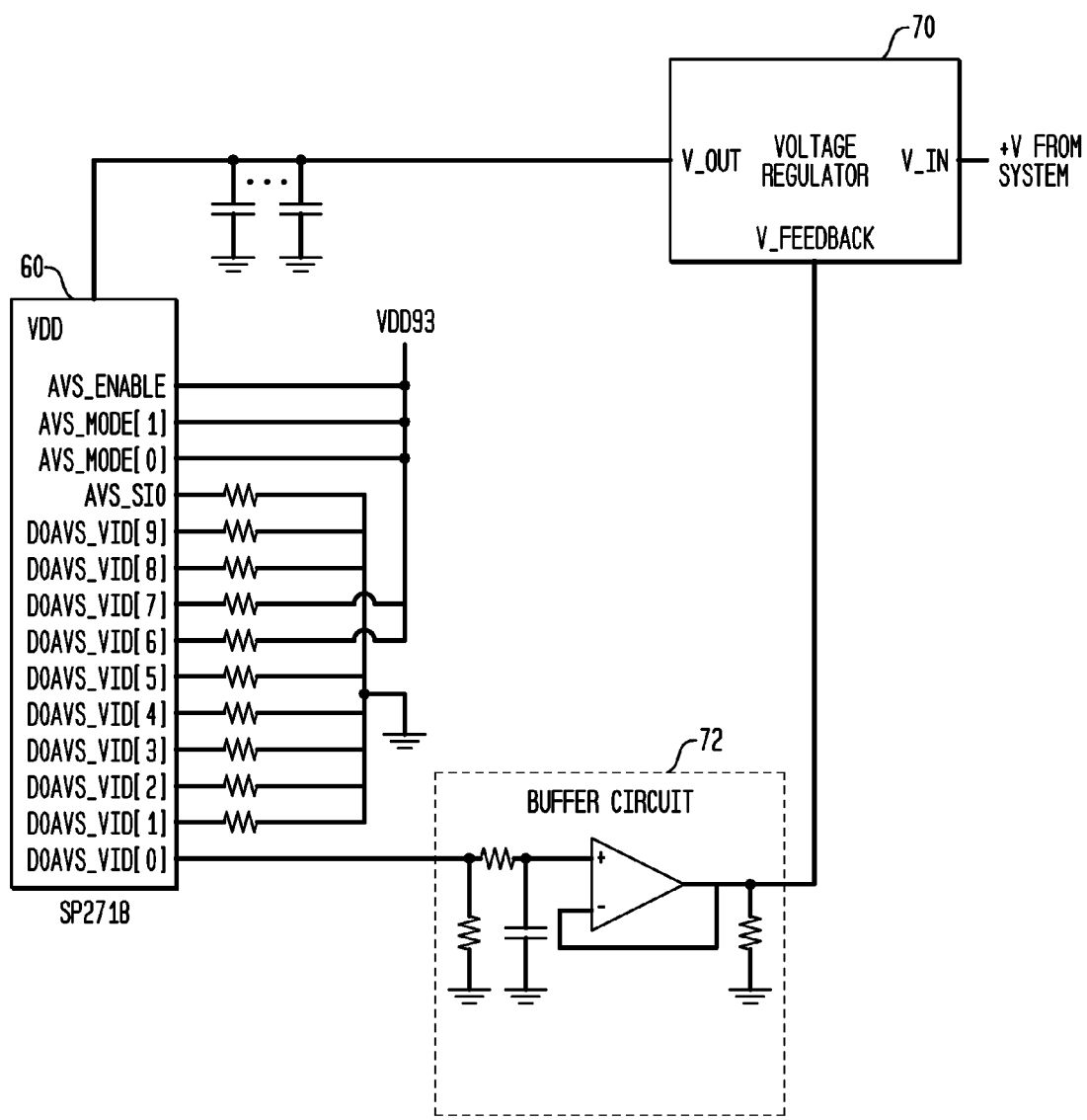
FIG. 5 is a schematic diagram depicting at least a portion of an exemplary circuit including the adaptive voltage scaling system shown in FIG. 4.

FIG. 5 is a schematic diagram depicting at least a portion of an exemplary voltage generation circuit including the AVS system 60 shown in FIG. 4, according to an embodiment of the invention. The illustrative voltage generation circuit shows connections between the AVS system 60 and a voltage regulator 70. A buffer circuit 72 is placed in close proximity with the AVS system 60 and the voltage regulator 70, and is coupled between a D0.AVS_VID[0] signal of the AVS system 60, which functions, in this embodiment, as the voltage regulator control signal, and a voltage feedback input of the voltage regulator 70.

The AVS system 60 is configured in either a master mode or slave mode based on voltage levels applied to control inputs (AVS_MODE[1:0] pins) of the AVS system 60. In the master mode, the AVS system 60 operates as a standalone unit, in which digital signal processor 63 communicates internally with digital signal processors 62 (see FIG. 4). The AVS system 60 drives the pulse-width modulated output voltage control signal as a function of process, voltage, and/or temperature (PVT) conditions associated with the device in the AVS system 60 exhibiting less favorable performance relative to one another (e.g., slowest or worst-case conditions). In the slave mode, multiple AVS systems 60 can be supported using one of the AVS systems 60, which is configured as a master device, to control the voltage regulator 70 for each of the multiple AVS systems 60. Table 1 below provides a listing of signal descriptions for pins associated with the AVS system 60 shown in FIGS. 4 and 5.

TABLE 1

| Pin Name | Type | Description |
| --- | --- | --- |
| AVS_ENABLE | INPUT | Enables AVS logic when tied to VDD33; and disables AVS logic when tied to VSS. |
| AVS_MODE[1:0] | INPUT | 11 = master mode; 01 = slave mode |
| D0.AVS_VID[9:0] | INPUT | AVS external voltage regulator control pins |
| AVS_SIO | INPUT/ OUTPUT | AVS serial interface input/output |

Table 2 below provides a listing of bit descriptions for the AVS external voltage regulator control pins D0.AVS_VID[9:0] for a pulse width modulation mode.

TABLE 2

| AVS_VID Bit | Description |
| --- | --- |
| 9 | PWM Mode |
|   | 0 = PWM Mode |
| 8 | PWM Frequency Bit 2 input - see Table 4 |
| 7 | PWM Frequency Bit 1 input - see Table 4 |
| 6 | PWM Frequency Bit 0 input - see Tsble 4 |
| 5:2 | Unused |
|   | Voltage Regulator Type |
| 1 | 1 = Type 1 voltage regulator |
|   | 0 = Type 2 voltage regulator |
| 0 | PWM output |

Table 3 below provides a listing of bit descriptions for the AVS external voltage regulator control pins D0.AVS_VID[9:0] in a digital mode.

TABLE 3

| AVS_VID Bit | Description |
| --- | --- |
| 9 | Digital Mode |
|   | 1 = Digital Mode |
| 8 | Digital Output bit 8 |
| 7 | Digital Output bit 7 |
| 6 | Digital Output bit 6 |
| 5 | Digital Output bit 5 |
| 4 | Digital Output bit 4 |
| 3 | Digital Output bit 3 |
| 2 | Digital Output bit 2 |

TABLE 3-continued

| AVS_VID Bit | Description |
| --- | --- |
| 1 | Digital Output bit 1 |
| 0 | Digital Output bit 0 |

Table 4 below shows the frequency and duty cycle of the output voltage control signal corresponding to different values of AVS_VID[8:6] bits assuming a chip input clock frequency of 50 MHz. The AVS system uses the chip input clock frequency divided by 2.

TABLE 4

| Number of Counter Bits (n) | PWM Frequency (kHz) | AVS_VID [8:6] | PWM Duty Cycle Step Size $100/(2^{n-1})$ (%) |
| --- | --- | --- | --- |
| 5 | 781.25 | 000 | 3.225 |
| 6 | 390.625 | 001 | 1.587 |
| 7 | 193.312 | 010 | 0.787 |
| 8 | 97.66 | 011 | 0.392 |
| 9 | 48.83 | 100 | 0.196 |
| 10 | 24.41 | 101 | 0.098 |
| 11 | 12.21 | 110 | 0.049 |
| 12 | 6.1 | 111 | 0.024 |

FIG. 6 is a block diagram depicting at least a portion of an exemplary machine in the form of a computing system 100 configured to perform the methods herein, according to an embodiment of the invention. The computing system 100 includes a set of instructions 102 that, when executed, cause the machine to perform any one or more of the methods described herein. In some embodiments, the machine is connected (e.g., via a network 122) to other machines. The network 122 may be wired (e.g., cable, optical, etc.) or wireless (e.g., IEEE 802.11, radio frequency (RF), microwave, infrared, etc.) In a networked embodiment, the machine operates in the capacity of a server or a client user machine in a server-client user network environment. The machine includes a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 100 includes a processing device(s) 104 (e.g., a central processing unit (CPU), a graphics processing unit (GPU), or both), program memory device(s) 106, and data memory device(s) 108, which communicate with each other via a bus 110. The computing system 100 further includes display device(s) 112 (e.g., liquid crystals display (LCD), flat panel, solid state display, or cathode ray tube (CRT)). The computing system 100 includes input device(s) 116 (e.g., a keyboard), cursor control device(s) 126 (e.g., a mouse), disk drive unit(s) 114, signal generation device(s) 118 (e.g., a speaker or remote control), and network interface device(s) 124 operatively coupled together, and/or with other functional blocks, via bus 110.

The disk drive unit(s) 114 includes machine-readable medium(s) 120, on which is stored one or more sets of instructions 102 (e.g., software) embodying any one or more of the methodologies or functions herein, including those methods illustrated herein. The instructions 102 also resides, completely or at least partially, within the program memory device(s) 106, the data memory device(s) 108, and/or the processing device(s) 104 during execution thereof by the computing system 100. The program memory device(s) 106 and the processing device(s) 104 also constitute machine-readable media. Dedicated hardware implementations, such as but not limited to application specific integrated circuits, programmable logic arrays, and other hardware devices can likewise be constructed to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions or logic described herein are implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 are further transmitted or received over the network 122 via the network interface device(s) 124 The machine-readable medium also contain a data structure for storing data useful in providing a functional relationship between the data and a machine or computer in an illustrative embodiment of the systems and methods herein.

While the machine-readable medium 102 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the detailed description, with each claim standing on its own as a separate example embodiment.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. An adaptive voltage scaling system, comprising:
a first device, the first device comprising at least one master serial interface port and at least one slave serial interface port; and
a second device, the second device comprising at least one master serial interface port and at least one slave serial interface port, the first device being operatively coupled to a voltage regulator, the at least one slave serial interface port associated with the second device being operatively coupled to the at least one master serial interface port associated with the first device, the first device controlling the voltage regulator based on information obtained from the first and second devices using the at least one master serial interface port associated with the first device and the at least one slave serial interface port associated with the second device, the first and second devices receiving voltage from the voltage regulator for powering the first and second devices.

2. The adaptive voltage scaling system, as defined by claim 1, wherein the information obtained from the first and second devices comprises at least one of process, voltage, and temperature information.

3. The adaptive voltage scaling system, as defined by claim 1, further comprising a third device, the third device comprising at least one master serial interface port and at least one slave serial interface port, the at least one slave serial interface port associated with the third device being operatively coupled to the at least one master serial interface port associated with the second device, the first device controlling the voltage regulator based on information obtained from the third device using the at least one master serial interface port associated with the first device, the at least one slave serial interface port associated with the second device, the at least one master serial interface port associated with the second device, and the at least one slave serial interface port associated with the third device, the third device receiving voltage from the voltage regulator for powering the third device.

4. The adaptive voltage scaling system, as defined by claim 3, wherein the information obtained from the third device comprises at least one of process, voltage, and temperature information.

5. The adaptive voltage scaling system, as defined by claim 1, wherein the first device compares information from the first and second devices and controls the voltage regulator based on data from the first and second devices that is indicative of less favorable operating conditions of the system.

6. The adaptive voltage scaling system, as defined by claim 5, wherein the data from the first and second devices that is indicative of less favorable operating conditions of the system comprises worst-case data.

7. The adaptive voltage scaling system, as defined by claim 5, wherein the first device controls the voltage regulator such that voltage provide to the first and second devices is decreased in response to worst-case data being greater than a predetermined worst-case threshold, the first device controlling the voltage regulator such that voltage provide to the first and second devices is increased in response to worst-case data being equal to or less than the predetermined worst-case threshold.

8. The adaptive voltage scaling system, as defined by claim 3, wherein the first device controls the voltage regulator such that voltage provide to the first, second, and third devices is decreased in response to worst-case data being greater than a predetermined worst-case threshold, the first device controlling the voltage regulator such that voltage provide to the first, second, and third devices is increased in response to worst-case data being equal to or less than the predetermined worst-case threshold.

9. A method of adaptive voltage scaling comprising controlling a voltage regulator by a first device based on information obtained from the first device and a second device using a master serial interface port associated with the first device and a slave serial interface port associated with the second device, the first device comprising at least one master serial interface port and at least one slave serial interface port, the second device comprising at least one master serial interface port and at least one slave serial interface port, the at least one master serial interface port associated with the first device being operatively coupled to the at least one slave serial interface port associated with the second device, the first and second devices receiving voltage from the voltage regulator for powering the first and second devices.

10. The method of adaptive voltage scaling, as defined by claim 9, wherein the information obtained from the first and second devices comprises at least one of process, voltage, and temperature information.

11. The method of adaptive voltage scaling, as defined by claim 9, further comprising controlling the voltage regulator by the first device based on information obtained from a third device using the at least one master serial interface port associated with the first device, the at least one slave serial interface port associated with the second device, the at least one master serial interface port associated with the second device, and at least one slave serial interface port associated with the third device, the third device comprising at least one master serial interface port and at least one slave serial interface port, the at least one slave serial interface port associated with the third device being operatively coupled to the at least one master serial interface port associated with the second device, the third device receiving voltage from the voltage regulator for powering the third device.

12. The method of adaptive voltage scaling, as defined by claim 11, wherein the information obtained from the third device comprises at least one of process, voltage, and temperature information.

13. The method of adaptive voltage scaling, as defined by claim 9, further comprising:
comparing information from the first and second devices by the first device; and
controlling the voltage regulator by the first device based on information from the first and second devices that is indicative of less favorable operating conditions of a system in which the method of adaptive voltage scaling is employed.

14. The method of adaptive voltage scaling, as defined by claim 13, further comprising:
controlling the voltage regulator such that voltage provided to the first and second devices is decreased in response to the information from the first and second devices that is indicative of less favorable operating conditions of the system being greater than a predetermined threshold; and
controlling the voltage regulator such that voltage provide to the first and second devices is increased in response to the information from the first and second devices that is indicative of less favorable operating conditions of the system being equal to or less than the predetermined threshold.

15. The method of adaptive voltage scaling, as defined by claim 13, wherein the information from the first and second devices that is indicative of less favorable operating conditions of the system comprises worst-case data.

16. The method of adaptive voltage scaling, as defined by claim 11, further comprising:
controlling the voltage regulator such that voltage provide to the first, second, and third devices is decreased in response to worst-case data being greater than a predetermined worst-case threshold; and
controlling the voltage regulator such that voltage provide to the first, second, and third devices is increased in response to worst-case data being equal to or less than the predetermined worst-case threshold.

17. A non-transitory computer-readable medium comprising instructions that, when executed by a processing device, causes the processing device to perform a computer process comprising controlling a voltage regulator by a first device based on information obtained from the first device and a second device using a master serial interface port associated with the first device and a slave serial interface port associated with the second device, the first device comprising at least one master serial interface port and at least one slave serial interface port, the second device comprising at least one master serial interface port and at least one slave serial interface port, the at least one master serial interface port associated with the first device being operatively coupled to the at least one slave serial interface port associated with the second device, the first and second devices receiving voltage from the voltage regulator for powering the first and second devices.

18. The computer-readable medium, as defined by claim 17, wherein the information obtained from the first and second devices comprises at least one of process, voltage, and temperature information.

19. The computer-readable medium, as defined by claim 17, wherein the method further comprises controlling the voltage regulator by the first device based on information obtained from a third device using the at least one master serial interface port associated with the first device, the at least one slave serial interface port associated with the second device, the at least one master serial interface port associated with the second device, and at least one slave serial interface port associated with the third device, the third device comprising at least one master serial interface port and at least one slave serial interface port, the at least one slave serial interface port associated with the third device being operatively coupled to the at least one master serial interface port associated with the second device, the third device receiving voltage from the voltage regulator for powering the third device.

20. The computer-readable medium, as defined by claim 17, wherein the method further comprises:
comparing information from the first and second devices by the first device; and
controlling the voltage regulator by the first device based on worst-case data from the first and second devices.

21. The computer-readable medium, as defined by claim 20, wherein the method further comprises:
controlling the voltage regulator such that voltage provide to the first and second devices is decreased in response to worst-case data being greater than a predetermined worst-case threshold; and
controlling the voltage regulator such that voltage provide to the first and second devices is increased in response to worst-case data being equal to or less than the predetermined worst-case threshold.

22. The computer-readable medium, as defined by claim 19, wherein the method further comprises:
controlling the voltage regulator such that voltage provide to the first, second, and third devices is decreased in response to worst-case data being greater than a predetermined worst-case threshold; and
controlling the voltage regulator such that voltage provide to the first, second, and third devices is increased in response to worst-case data being equal to or less than the predetermined worst-case threshold.

* * * * *